June 14, 1932.  W. VAN E. THOMPSON  1,862,812
SPRAY ADJUSTMENT MEANS FOR SPRINKLER HEADS
Filed Jan. 10, 1928
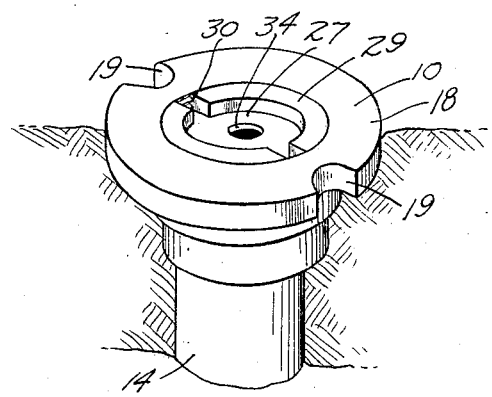
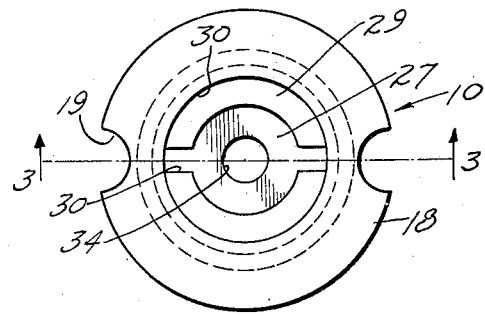
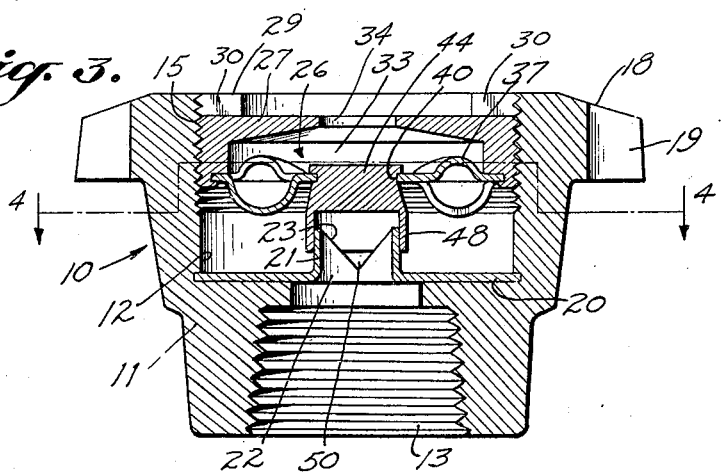
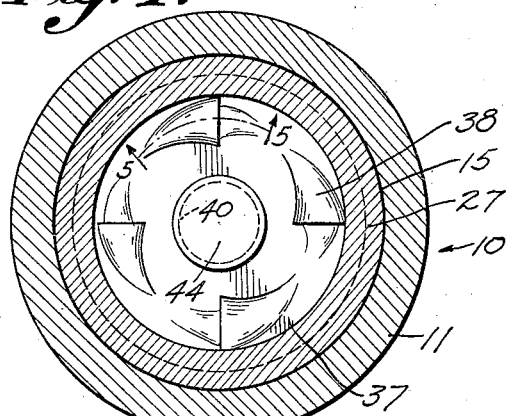
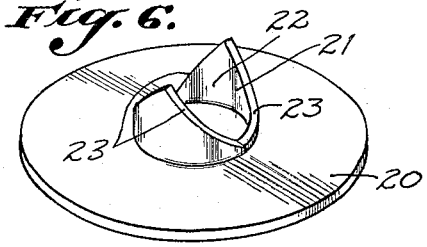
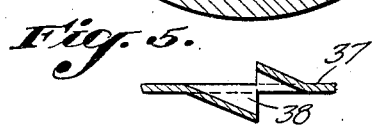
INVENTOR:
Walter Van E. Thompson
BY
ATTORNEY.

Patented June 14, 1932

1,862,812

UNITED STATES PATENT OFFICE

WALTER VAN E. THOMPSON, OF LOS ANGELES, CALIFORNIA, ASSIGNOR TO THOMPSON MANUFACTURING COMPANY, OF LOS ANGELES, CALIFORNIA, A CORPORATION OF CALIFORNIA

SPRAY ADJUSTMENT MEANS FOR SPRINKLER HEADS

Application filed January 10, 1928. Serial No. 245,678.

My invention relates to spray nozzles and more particularly to lawn sprinklers.

In the type of lawn sprinkler system in general use, a large number of sprinkler heads are located near the surface of the lawn and spaced apart equally over the area to be watered. These heads are supplied with water through a single system of underground piping laid beneath the lawn. As the pressure of water supplied to all the heads is thus uniform, each head must be provided with an adjustment by which the radius to which water is sprayed by that head may be regulated, to the end that the spray of adjacent heads will overlap as little as possible and the lawn thus be uniformly watered. This adjustment means in many of the sprinkler heads in use is either expensive to make or likely to get out of order.

It is an object of my invention to provide a sprinkler head having an improved spray adjustment means.

Another object of my invention is to produce a sprinkler head which may be produced at a low cost.

Many lawn sprinkling systems are supplied with water from reservoirs from which snail shell and other débris are conveyed to the sprinkler heads so as to clog the valve or spray adjustment means of these.

It is a further object of my invention to provide a sprinkler head having a spray adjustment means which can be readily cleansed of such débris whenever the sprinkler head thus becomes clogged.

I have found moreover that the tendency of the sprinkler heads in general use to clog is due to the fact that the water orifice or orifices in the adjustment valve are narrow so that only objects of relatively small size may freely pass through.

It is an object of my invention to provide a sprinkler head in the adjustment valve of which the orifices are relatively wide so that these will have a minimum tendency to clog.

A further object of my invention is to provide a sprinkler head in which the adjustment valve may be operated to quickly enlarge the smaller dimension of an orifice of the valve so as to permit a clogging obstruction to pass through said orifice.

A further object of my invention is to provide a valve construction consisting of a primary sleeve open at both ends and a secondary sleeve open at one end. The sleeves are relatively movable and are in engagement. One of said sleeves is provided with a V-shaped notch.

A further object of the invention is to provide a valve of this character in which the secondary sleeve, which is open only at one end, extends on the outside of the primary sleeve and the primary sleeve has a notch formed in it.

In the development of the valve of my invention I have devised a novel valve member which constitutes an important part of the invention.

It is an object of my invention to provide an article of manufacture comprising a valve member in the form of a plate having a central portion bent outward to form a passage, this outward bent portion providing a notch.

Still further objects and advantages of my invention will be made apparent in the following description and the accompanying drawing in which Fig. 1 is a perspective view of the preferred embodiment of the sprinkler head of my invention.

Fig. 2 is a plan view of Fig. 1.

Fig. 3 is an enlarged vertical sectional view taken on the line 3—3 of Fig. 2.

Fig. 4 is a horizontal sectional view taken on the line 4—4 of Fig. 3.

Fig. 5 is a fragmentary vertical sectional view taken on the line 5—5 of Fig. 4, illustrating the formation of a port in the swirl plate of my invention.

Fig. 6 is a perspective view illustrating the valve plate of the preferred embodiment of my invention.

Referring specifically to the drawing, the preferred embodiment of my sprinkler head shown in Fig. 1 may be indicated by the numeral 10. The sprinkler head 10 has a body 11 in which are formed a substantially cylindrical main cavity 12 and a tapped hole 13 into which a liquid supply pipe 14 is adapted to be screwed. The mouth of the cavity 12 is provided with internal threads 15 and extending outwardly from the open end of the body 11 is a flange 18 having notches 19 provided therein to receive a wrench by which the sprinkler head 10 may be screwed upon or removed from the pipe 14. The body 11 is preferably formed of babbitt or some other soft metal which may be easily die cast, and in the casting of the body a valve plate 20 is placed so as to form the bottom of the cavity 12 and so that the periphery of the plate is embedded in the material of the body 11.

Drawn upwardly from the central portion of the plate 20 is a tubular sleeve 21, there being a liquid supply opening 22 thus formed centrally in the plate 20. The sleeve 21 is provided with a pair of deep notches 23 on opposite sides thereof, the apexes of these notches reaching almost to the body of the plate 20.

Adapted to be adjustably disposed in the cavity 12 is a spray forming means 26, which includes a spray cap 27 which is externally threaded so as to screw into the internal threads 15 of the cavity 12 and which has an upward extending wall 29 formed about the periphery thereof which is provided with notches 30 adapted to receive a suitable wrench for screwing the cap 27 into the threads 15.

The cap 27 has a swirl cavity 33 which is connected to the atmosphere by a discharge port 34. Secured in the mouth of the cavity 33, which is disposed downwardly, as by swedging a portion of the material of the cap 27 about the periphery thereof, is a swirl plate 37 which is provided with a series of swirl ports 38 stamped from the material of the swirl plate 37 so that these ports are formed on an axis helically disposed relative to the central axis of the cavity. The swirl plate 37 has a central hole 40 which is closed by the head of a valve closure member 44 by the protruding of this head through the hole 40 and by swedging the material of the closure member over the edge of the hole. The lower portion of the closure member 44 is hollow to provide a valve sleeve 48 which extends over the sleeve 21 of the valve plate 20 when the spray forming means is screwed downwardly in the cavity 12.

As clearly shown in Fig. 3, the sleeve 48, when in downwardmost position, will entirely close the notches 23 of the sleeve 21, so as to close the fluid supply opening 22. It is also to be noted that when the spray forming means 26 is disposed upwardly from its lowermost position in the cavity 12, orifices 50 are formed between the lower edge of the sleeve 48 and the edges of the notches 23, which orifices are triangular in shape. As the spray forming means 26 is moved upwardly the minimum dimension of each of these orifices is constantly increased. Thus if the orifices 50, as adjusted in size for normal operation of the sprinkler head 10, become clogged with débris carried by the water supplied through the pipe 14, these orifices may easily be cleared by unscrewing the spray forming means 26 a slight distance so as to enlarge somewhat the minimum dimension of these orifices.

It is clear that while the notches 23 are shown as formed in the sleeve 21, the construction shown might be modified so that the sleeve 21 would be intact and notches similar to the notches 21 would be formed in the sleeve 48. It is also equally clear that while the valve closure member 44 controls the size of the orifices 50 by means of the sleeve 48, the same control might be effected by a similar sleeve or plug formed upon the closure member 44 but which would extend inside the sleeve 21.

As will be seen in the foregoing description, a very important part of the invention is that the spray forming means is bodily adjustable in the body 10 and has one of the valve members attached thereto so that the amount of water flowing through the spinkler may be adjusted by adjusting the position of the spray forming means. This is a valuable feature of the invention in view of the fact that when the valve is adjusted the parts of the spray forming means retain their relative position, adjustment is easy, replacement may be readily made, and adjustment may be made while the water is flowing. In my invention it is not necessary to extend any wrenches or other devices through the orifice 34 in order to adjust the water control valve.

The sleeve 21 bent outwardly from the plate 20 constitutes the primary sleeve of my invention and the sleeve 48 constitutes the secondary sleeve of my invention.

I claim as my invention:

1. An article of manufacture comprising a valve member in the form of a plate having the central portion bent outward to form a passage, said bent portion providing a notch.

2. An article of manufacture comprising a valve member in the form of a plate having the central portion bent outward to form a passage, said bent portion providing a V-shaped notch, the apex of which is near said plate.

In testimony whereof, I have hereunto set my hand at Los Angeles, California, this 5th day of January, 1928.

WALTER VAN E. THOMPSON.